(12) United States Patent
Thubert et al.

(10) Patent No.: US 7,428,221 B2
(45) Date of Patent: *Sep. 23, 2008

(54) ARRANGEMENT FOR PROVIDING NETWORK PREFIX INFORMATION FROM ATTACHED MOBILE ROUTERS TO A CLUSTERHEAD IN A TREE-BASED AD HOC MOBILE NETWORK

(75) Inventors: Pascal Thubert, La Colle sur Loup (FR); Patrick Wetterwald, Mouans Sartoux (FR); Marco Molteni, Antibes (FR); Billy G. Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

This patent is subject to a terminal disclaimer.

(21) Appl. No.: 10/856,809

(22) Filed: Jun. 1, 2004

(65) Prior Publication Data

US 2005/0265259 A1   Dec. 1, 2005

(51) Int. Cl.
  *H04L 12/28* (2006.01)
(52) U.S. Cl. .................. 370/255; 370/237; 370/238; 370/256; 370/328; 370/352; 370/395.31; 370/408; 379/114.13; 709/242
(58) Field of Classification Search .......... 370/255, 370/237, 238, 238.1, 256, 328, 329, 352, 370/389, 392, 395.31, 408; 379/114.13; 709/242, 238
See application file for complete search history.

(56) References Cited

U.S. PATENT DOCUMENTS 7,184,421 B1 *   2/2007   Liu et al. ................. 370/338

2002/0039357 A1   4/2002   Lipasti et al.
2004/0032852 A1   2/2004   Thubert et al.
2004/0057440 A1   3/2004   Thubert et al.
2004/0081152 A1*  4/2004   Thubert et al. ............ 370/392

(Continued)

FOREIGN PATENT DOCUMENTS

EP   1 324 532 A2   7/2003

(Continued)

OTHER PUBLICATIONS

Perkins, "Ad Hoc Networking", 2001, pp. 1-28 Addison-Wesley.

(Continued)

*Primary Examiner*—Matthew Anderson
*Assistant Examiner*—Shaima Q Aminzay
(74) *Attorney, Agent, or Firm*—Leon R. Turkevich

(57) ABSTRACT

Mobile routers establish a tree-based network topology in an ad hoc mobile network, the tree-based network topology having a single clusterhead and attached mobile routers. Each attached mobile router has a default egress interface configured for sending messages toward the clusterhead, and ingress interfaces configured for receiving messages from attached network nodes that are away from the clusterhead. A neighbor advertisement message received from an ingress interface away from a clusterhead is used by the attached mobile router to identify specified network prefixes that are reachable via the source of the neighbor advertisement message. The attached mobile router outputs on its default upstream interface a second neighbor advertisement message that specifies the network prefix used by the attached mobile router, and the specified network prefixes from the neighbor advertisement message received on the ingress interface. Hence, connectivity is established with minimal routing overhead.

67 Claims, 7 Drawing Sheets

U.S. PATENT DOCUMENTS

2004/0117339 A1    6/2004   Thubert et al.
2004/0246931 A1   12/2004   Thubert et al.
2006/0227724 A1*  10/2006   Thubert et al. .............. 370/254

OTHER PUBLICATIONS

Narten et al., "Neighbor Discovery for IP Version 6 (IPv6)", Request for Comments: 2461, IETF Network Working Group, Dec. 1998.

Moy, "OSPF Version 2", Request for Comments: 1583, IETF Network Working Group, Mar. 1994.

Ernst et al., "Network Mobility Support Terminology", Internet Draft, IETF Working Group, draft-ernst-monet-terminology-00.txt, Feb. 2002.

Johnson et al., "The Dynamic Source Routing Protocol for Mobile Ad Hoc Networks (DSR)", Internet Draft, IETF MANET Working Group, draft-ietf-manet-dsr-09.txt, Apr. 15, 2003.

Perkins et al., "Ad Hoc On-Demand Distance Vector (AODV) Routing", Internet Draft, Mobile Ad Hoc Networking Working Group, draft-ietf-manet-aodv-13.txt, Feb. 17, 2003.

Baker, "An outsider's view of MANET", Internet Draft, Network Working Group, draft-baker-manet-review-01, Mar. 17, 2002.

Clausen et al., "Optimized Link State Routing Protocol (OLSR)", Request for Comments: 3626, Network Working Group, Oct. 2003.

Garcia-Luna-Aceves, "Source Tree Adaptive Routing (Star) Protocol", Internet Draft, IETF MANET Working Group, draft-ietf-manet-star-00.txt, Oct. 22, 1999.

Thubert et al, "IPv6 Reverse Routing Header and its application to Mobile Networks", Internet Draft, Network Working Group, draft-thubert-nemo-reverse-routing-header-04, Feb. 2004.

Thubert et al., "IPv6 Reverse Routing Header and its application to Mobile Networks", Internet Draft, Network Working Group, draft-thubert-nemo-reverse-routing-header-01, Oct. 11, 2002.

Thubert et al., "Taxonomy of Route Optimization models in the Nemo Context", Internet Draft, Network Working Group, draft-thubert-nemo-ro-taxonomy-00, Oct. 11, 2002.

Thubert et al., "Taxonomy of Route Optimization models in the Nemo Context", Internet Draft, Network Working Group, draft-thubert-nemo-ro-taxonomy-01, Jun. 3, 2003.

Thubert et al., "Taxonomy of Route Optimization models in the Nemo Context", Internet Draft, Network Working Group, draft-thubert-nemo-ro-taxonomy-02, Feb. 15, 2004.

* cited by examiner

ARRANGEMENT FOR PROVIDING NETWORK PREFIX INFORMATION FROM ATTACHED MOBILE ROUTERS TO A CLUSTERHEAD IN A TREE-BASED AD HOC MOBILE NETWORK

BACKGROUND OF THE INVENTION

1. Field of the Invention

The present invention relates to routing protocols for establishment of an ad hoc mobile network by mobile routers, where the routing protocols are optimized for minimal overhead for accommodating rapid topology changes in the ad hoc mobile network.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. For example, the IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, including an Internet Draft by Thierry Ernst, entitled "Network Mobility Support Terminology", February 2002.

According to the NEMO group, a mobile network may be composed by one or more IP subnets and is connected to the global Internet via one or more Mobile Routers (MR). The mobile router has at least two network interfaces: an egress interface toward the wide area network, and an ingress interface from within the mobile network. Mobile network nodes may include local fixed nodes (LFN) (nodes unable to change their point of attachment while maintaining ongoing sessions), local mobile nodes (LMN) (mobile nodes that belong to the mobile network and able to change their point of attachment within the mobile network or outside the mobile network), and visiting mobile nodes (VMN) (mobile nodes that not belong to the mobile network and that can change their point of attachment from outside the mobile network to inside the mobile network). Each of the nodes may be either a host or a router.

Hence, a mobile router is a router configured for establishing a communication link between the mobile network and an attachment router. As apparent from the foregoing, an objective of NEMO is providing mobile nodes with protocols for establishing connectivity with a wide area network, such as the Internet. The mobile router thus serves as a gateway to route packets between the mobile network and the Internet.

Unfortunately, existing Internet-based routing protocols that assume a persistent connection to a wide area network such as the Internet rely on the ability to aggregate reachability to IP nodes, where all nodes sharing a common network link (such as a link of a top level mobile router connecting to an attachment router on the Internet) share the same routing prefix. Such aggregation creates a hierarchy of network prefixes that enables scalability. However, such a hierarchy is not possible in ad hoc networks.

The IETF has a Mobile Ad-hoc Networks (MANET) Working Group that is working to develop standardized MANET routing specification(s) for adoption by the IETF. According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure.

When the addressed device moves, therefore, the motion changes the routing infrastructure. Hence, as described in an Internet Draft by Baker, entitled "An Outsider's View of MANET" (Mar. 17, 2002), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

Existing MANET protocols focus on the internal connectivity within the unstable topology between mobile devices; however, the existing MANET protocols suffer from the disadvantage that they provide a poor model for connecting to a wide area network such as the Internet.

MANET protocols can be divided into the following types: stateful (proactive); and stateless (reactive). Proactive MANET protocols distribute routing information throughout the MANET network, enabling the routers within the MANET network to store route information before a data packet needs to be routed; hence, a router determines how to forward a packet based on accessing routing information from an internal table. However, proactive protocols suffer the disadvantage of requiring update messages to update obsolete route entries: the necessity for update messages increases with a corresponding desire for an improvement in route optimization.

Proactive MANET protocols can be subdivided into two subtypes, or "families": Optimized Routing Approach (ORA), and Least Overhead Routing Approach (LORA). The ORA type protocols are similar to routing protocols used in the Internet, in that they stress maintaining the best states to maintain the shortest path routes, at the expense of requiring more control messages to exchange routes. An example of an ORA type routing protocol is Open Shortest Path First (OSPF) (as specified by the IETF Request for Comments (RFC) 1583), or Intermediate System-to-Intermediate System (IS-IS) protocol (specified by the International Organization for Standardization document ISO 10589). However, the OSPF and IS-IS protocols suffer from the disadvantage that they may require up to a minute to converge (i.e., complete protocol communications necessary to establish a connection) and hence may not be able to converge quickly enough for a mobile router that is moving from one location to another. For example, in the case of two vehicles passing each other, each having a mobile router, there may exist approximately ten seconds for the mobile routers to establish a connection; hence, routing protocols requiring up to a minute to converge would be unable to establish a connection.

Reactive protocols were developed to address the slow convergence of ORA type proactive protocols, where routing information is acquired only when needed. Examples of reactive protocols are described in an Internet Draft by Perkins et al., "Ad hoc On-Demand Distance Vector (AODV) Routing (draft-ietf-manet-aodv. 13), Feb. 17, 2003, and an Internet Draft by Johnson et al., "The Dynamic Source Routing Protocol for Mobile Ad Hoc Networks (DSR) <draft-ietf-manet-dsr-09.txt>", Apr. 15, 2003. Reactive protocols require less bandwidth than proactive protocols, but the latency for many applications will increase substantially, resulting in long delays. Such delays become quite apparent if a mobile user attempts to execute a bandwidth-intensive application on the ad hoc network instead of a typical high-speed wired connection on the Internet using a conventional connection (e.g., hard-wired LAN, cable modem, etc.).

The LORA family of proactive protocols attempts to provide a compromise between the fully stateful (ORA family) protocols and the fully stateless (reactive) protocols. One example of a LORA-type protocol is described in an Internet Draft by Garcia-Luna-Aceves, et al., "Source Tree Adaptive Routing (STAR) Protocol <draft-ietf-manet-star.00.txt>", Oct. 22, 1999. However, even the disclosed STAR protocol suffers from disadvantages of requiring routing messages to establish a stable topology within the MANET network. For example, the STAR protocol requires a router to transmit the parameters of its source routing tree, including each link that the router needs to reach every known destination (and address range) in the ad hoc network or Internet. Although the STAR router attempts to conserve transmission bandwidth and energy by sending changes to its source routing tree only when the router detects new destinations, the possibility of looping, or the possibility of node failures or network partitions, the necessity of transmitting such parameters for each and every link still imposes substantial messaging requirements that affects bandwidth availability and network convergence times.

Hence, existing LORA-type protocols still provide only limited improvements in reducing convergence time and update messages between routers.

SUMMARY OF THE INVENTION

There is a need for an arrangement that enables mobile routers to establish an ad hoc network with minimal overhead and that enables rapid convergence for accommodating rapid topology changes in the ad hoc mobile network.

There also is a need for an arrangement that enables routers to establish an ad hoc network with a minimal amount of routing information within internal routing tables, and which eliminates the necessity of sending messages related to maintaining a stable network topology.

These and other needs are attained by the present invention, where mobile routers having established a tree-based network topology in an ad hoc mobile network establish connectivity between the routers based on each attached mobile router, connected to an attachment mobile router via a corresponding egress interface, sending a neighbor advertisement message via the corresponding egress link. In particular, the mobile routers establish the tree-based network topology, the tree-based network topology having a single clusterhead and attached mobile routers. Each attached mobile router has a default egress interface configured for sending messages toward the clusterhead, and ingress interfaces configured for receiving messages from attached network nodes that are away from the clusterhead. A neighbor advertisement message received from an ingress interface away from a clusterhead is used by the mobile router to identify specified network prefixes that are reachable via the source of the neighbor advertisement message. If the mobile router is not designated as the clusterhead, the mobile router outputs on its default egress interface a second neighbor advertisement message that specifies the network prefix used by the mobile router, and the specified network prefixes from the neighbor advertisement message received on the ingress interface.

Hence, connectivity is established in a tree-based topology using minimal routes by routing received packets specifying known prefixes as destinations to the identified ingress interface, and routing unknown prefixes via the default egress interface for routing by an attachment router.

One aspect of the present invention provides a method in a mobile router configured for establishing communications within an ad hoc network. The method includes attaching to an attachment router based on an advertisement message from the attachment router that specifies an attachment prefix, and according to a protocol requiring establishment in the ad hoc network of a tree topology having a single clusterhead. The attaching to the attachment router also is based on selecting a default attachment address within an address space of the attachment prefix. The method also includes outputting to the attachment router a neighbor advertisement message specifying that a prescribed address prefix used by the mobile router is reachable via the default attachment address, based on the mobile router having attached to the attachment router, the prescribed address prefix distinct from the attachment prefix.

Another aspect of the present invention provides a mobile ad hoc network. The network includes a first router, and second and third mobile routers. The first router includes an advertisement resource configured for outputting a first advertisement message. The first advertisement message includes a tree information option field that specifies a prescribed address prefix used by the first router, and a tree attribute field that advertises the first router as a clusterhead of a tree topology in the ad hoc network. The first router also includes an ad hoc routing table configured for storing respective entries specifying that respective address prefixes are reachable via respective attachment addresses, and a neighbor discovery resource. The neighbor discovery resource is configured for adding the respective entries based on receiving respective neighbor advertisement message specifying that the respective address prefixes are reachable via the respective attachment addresses, each of the attachment addresses within an address space of the prescribed address prefix, each of the address prefixes distinct from each other and the prescribed address prefix. Each of the second and third mobile routers include an attachment resource and a neighbor advertisement resource. The attachment resource is configured for attaching to the first router based on the first advertisement message and according to a protocol requiring establishment of a tree topology in the ad hoc network, and based on selecting the corresponding attachment address within the address space. The neighbor advertisement resource is configured for outputting the corresponding neighbor advertisement message specifying the corresponding address prefix used by the mobile router is reachable via the corresponding attachment address, based on the mobile router having attached to the first router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
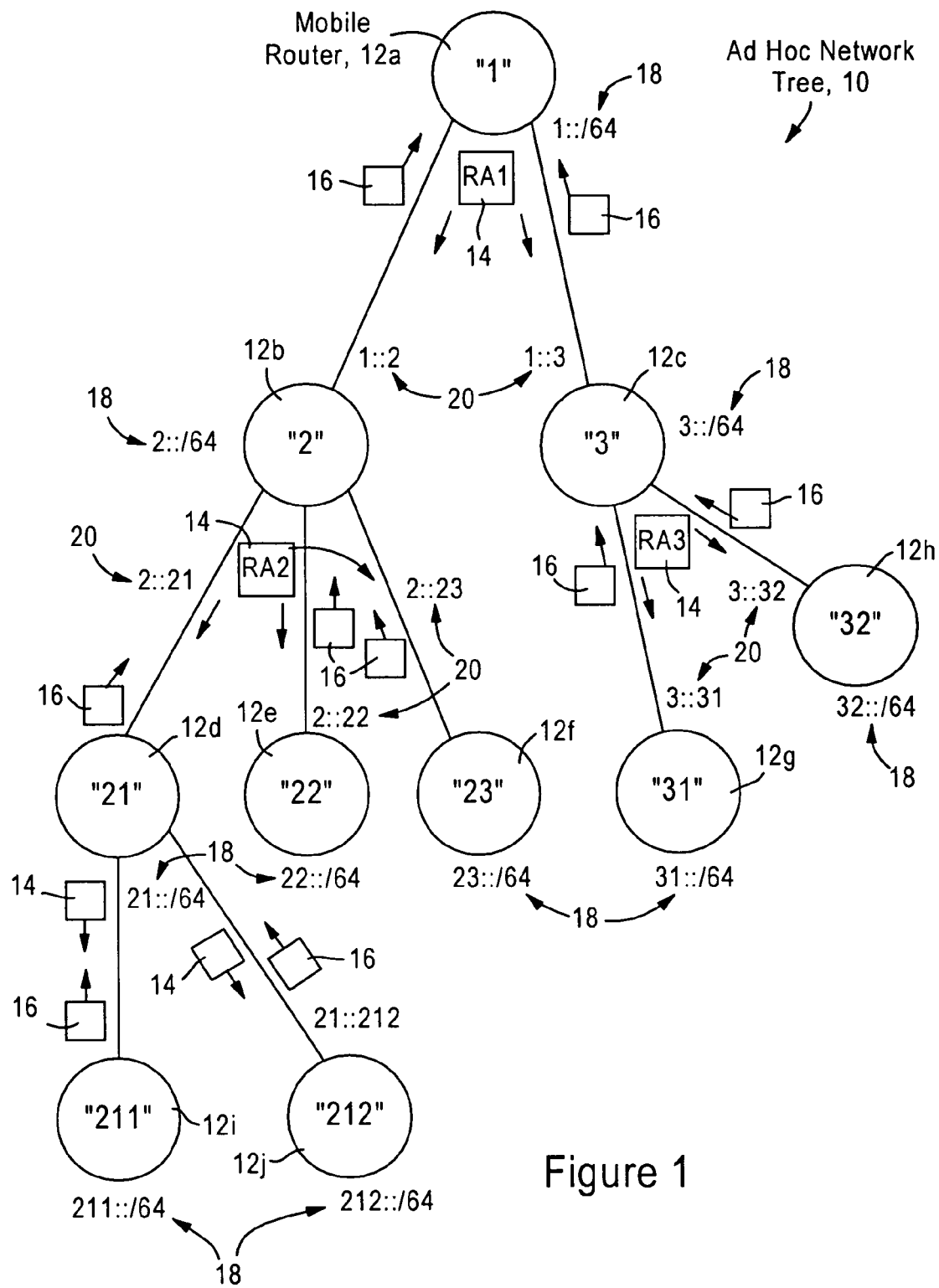
FIG. 1 is a diagram illustrating a mobile ad hoc network having multiple mobile routers connected to a mobile router serving as a clusterhead for a tree-based topology, enabling distribution of routes using neighbor advertisement messages, according to an embodiment of the present invention.

FIG. 1 is a diagram illustrating a mobile ad hoc network 10 formed by mobile routers 12 serving as at least one of an attached mobile router and an attachment mobile router. Each attachment router (e.g., a clusterhead 12a) is configured for outputting a router advertisement message 14 that specifies a prescribed address prefix 18 used by the attachment router, and each attached mobile router (e.g., 12b, 12c) is configured for attaching to one of the attachment routers in response to received advertisement messages by selecting a default attachment address 20, and in compliance with a protocol requiring establishment of a tree topology having a single clusterhead. Note that the address prefix (e.g., "1::/64") 18 used by a mobile router (e.g., 12a) refers to the address prefix used by the mobile router 18 in creating and maintaining an addressable subnet for routing of data packets to nodes connected to ingress ports of the mobile router 18; in other words, a mobile router 18 includes address table entries for routing packets within the subnet specified by the address prefix used by the mobile router 18.

According to the disclosed embodiment, the tree topology illustrated in the mobile ad hoc network 10 is relied upon in minimizing the amount of routing information needed to be transferred among mobile routers. In particular, a tree topology having a single clusterhead 12a inherently has no loops. Since the tree topology 10 inherently has no loops, attached mobile routers can be configured to provide no more than the minimum routing information necessary for an attached mobile router to identify network address prefixes that are reachable via an attached mobile node.

Hence, attached mobile routers (e.g., 12b, 12c) identify themselves to an attachment mobile router (e.g., 12a) by sending neighbor advertisement messages 16 that specify a network-in-node option, namely that a network node has at least one network address prefix. The network-in-node option specifies to the attachment mobile router (e.g., 12a) merely that a given network prefix 18 (e.g., 2::/64 of mobile router "2" 12b) is reachable via a default attachment address 20 (e.g., 1::2) within the address space of the address prefix 18 of the attachment router (i.e., the attachment prefix).

Hence, a neighbor advertisement message 16 from the attached mobile router 12b can be detected by the attachment mobile router 12a to specify merely that the network prefix "2::/64" 18 is reachable via the address "1::2" 20 which is within the address realm (i.e., address space) of the attachment prefix "1::/64" 18 used by the attachment mobile router 12a. Note that no further routing information (e.g., hop count, home address of a node, topology information, source routing information, link state information, etc.) needs to be sent to the attachment router 12a, since the attachment mobile router only needs to be aware of address prefixes of attached mobile routers. As described in detail below, the mobile routers 12 are configured for routing any packet specifying an unknown destination to its default attachment router; hence, the packet is routed toward the clusterhead 12a until a mobile router can identify the destination address relative to an identified network prefix 18.

Hence, the disclosed embodiment provides an efficient proactive routing protocol for ad hoc networks that minimizes the necessity of bandwidth and processing requirements to accommodate rapid topology changes by providing rapid convergence. Hence, the disclosed embodiment provides a LORA type routing protocol even more efficient than the above-described STAR protocol.

As described above, the disclosed embodiment relies on the formation by the mobile routers 12 of the tree topology, illustrated in FIG. 1. A description will first be provided of formation of the tree topology, followed by a description of the neighbor discovery messages 16 used to forward reachability information.

The disclosed embodiment dynamically assembles the layer 2 clusters into a tree-based topology model 10 as illustrated in FIG. 1 using the attachment techniques described in commonly-assigned, copending application Ser. No. 10/218, 515, filed Aug. 15, 2002, entitled "ARRANGEMENT FOR ROUTER ATTACHMENTS BETWEEN ROAMING MOBILE ROUTERS IN A MOBILE NETWORK", published on Feb. 19, 2004 as U.S. Patent Application Publication U.S. 2004/0032852 A1, the disclosure of which is incorporated in its entirety herein by reference.

According to the disclosed embodiment, the ad hoc network 10 is organized into a tree-based topology cluster, where the clusterhead (i.e., a root of a tree) 12a is determined by having the highest relative preference metric visible to other mobile routers. Preference metric may be based on an explicit preference value, described below, or based on a tree depth identifier indicating the relative position of the mobile router relative to the clusterhead; in other words, tree depth indicates the number of hops to the clusterhead. A mobile router associates with the router advertisement (RA) originator by storing the information in the RA message in its default router list, and selecting the source of the RA message as its attachment router.

Hence, the mobile routers 12b through 12j choose attachment routers based on preference metrics specified in received router advertisement messages 14. As illustrated in FIG. 1, the mobile routers 12b and 12c, in response to detecting the unsolicited router advertisement message ("RA1") 14, add the RA1 message 14 to their internal default router lists 55, described in detail below with respect to FIG. 4. The mobile routers 12b and 12c select the mobile router 12a as their attachment router based on a specified preference metric (e.g., preference value, mobile router 12a advertised as a clusterhead, etc.).

For example, the mobile router 12b creates a default attachment address ("1::2") 20 on its egress interface that is within the address space of the address prefix "1::/64" 18 advertised by the clusterhead 12a; the mobile router 12b also adds an entry in its routing table that specifies that the address prefix "1::/64" is reachable via the default attachment address "1::2" 20. Similarly, the mobile router 12c creates a default attachment address ("1::3") 20 on its egress interface that is within the address space of the address prefix "1::/64" 18 advertised by the clusterhead 12a; the mobile router 12c also adds an entry in its routing table that specifies that the address prefix "1::/64" is reachable via the default attachment interface having been assigned the default attachment address The mobile routers 12b and 12c begin outputting respective router advertisement messages "RA2" and "RA3" 14, advertising their respective address prefixes 18 ("2::/64" and "3::/64"), and the tree depth/preference based on the clusterhead 12a being the top level mobile router. As described above, any unknown address is sent by a mobile router to its default attachment address; hence, the router advertisement messages "RA2" and "RA3" 14 need not specify the address prefix "1::/64" of the clusterhead, since all attached mobile routers (e.g., 12d, 12e, 12f, 12g, 12g) will forward unknown destinations by default to the mobile routers 12b or 12c.

The mobile routers 12d, 12e, 12f having the respective network prefixes 18 ("21::/64", "22::/64", and "23::/64") attach to the mobile router 12b as their attachment router by selecting respective default attachment addresses 20 ("2::21", "2::22" and "2::23"). The mobile routers 12g, 12h, having the respective network prefixes 18 ("31::/64" and "32::/64") attach to the mobile router 12c as their attachment router by selecting respective default attachment addresses 20 ("3::31" and "3::32").

Similarly, the mobile router 12d outputs a router advertisement message "RA21" 14 advertising its address prefix 18 ("21::/64"). In response, the routers 12i and 12j having address prefixes 18 ("21::/64" and "212::/64") select respective default attachment addresses 20 ("21::211" and "21::212").

Assuming that no other information has been output into the network 10 other than the router advertisement messages 14, each mobile router only knows its default route toward the clusterhead 12a. In other words, none of the mobile routers 12 have any information related to any attachment nodes away from the clusterhead. For example, if the mobile router 12i ("211") wanted to send a ping to the mobile router 12h at the destination address "32::1", the ping would be transferred up to the clusterhead 12a by the mobile routers 12d and 12b, which are configured to output unknown destinations on their respective default attachment addresses. However, since the mobile router 12a does not know about the reachability of the mobile router "32" 12h serving the address prefix "32::/64", the mobile router 12a would drop the ping unless was specifically addressed to a destination address within the address prefix "1::/64" used by the clusterhead 12a. Also note that even though the mobile router 12a may know about the layer 2 (MAC) addresses of the mobile routers 12b and 12c, the mobile router 12a does not have information regarding the global IP addresses utilized by the mobile routers 12b and 12c; further, the mobile router 12a would not be able to locate the address prefixes used by the mobile routers 12d, 12e, 12f, 12g, 12h, 12i, and 12j because they do not share a layer 2 link with the mobile router 12a.

At this stage proactive routing protocols typically would be used to exchange topology and reachability information between the routers, and to ensure no loops were formed. However, the disclosed embodiment emphasizes minimizing the use of routing protocols due to their substantial costs that increase convergence times.

As described below, internal communications within the cluster 10 can be minimized using the neighbor discovery messages 16, eliminating the necessity for optimizing procedures such as the proactive Optimized Routing Algorithm (ORA) MANET protocol. In contrast to all the mobile routers 12 registering with the clusterhead 12a to provide the clusterhead 12a with the source route path to all the prefixes 18, the clusterhead 12a simply needs to know which attachment address (e.g., 1:2 or 1:3) 20 should be used to reach the identified prefix 18.

Hence, each attached mobile router 12 sends to its attachment router a neighbor advertisement message 16 specifying that the prescribed address prefix used by the mobile router 12, and any address prefixes stored internally from received neighbor advertisement messages received by the attached mobile router from other mobile routers, are reachable via the default attachment address used by the mobile router 12.

Figure 2:
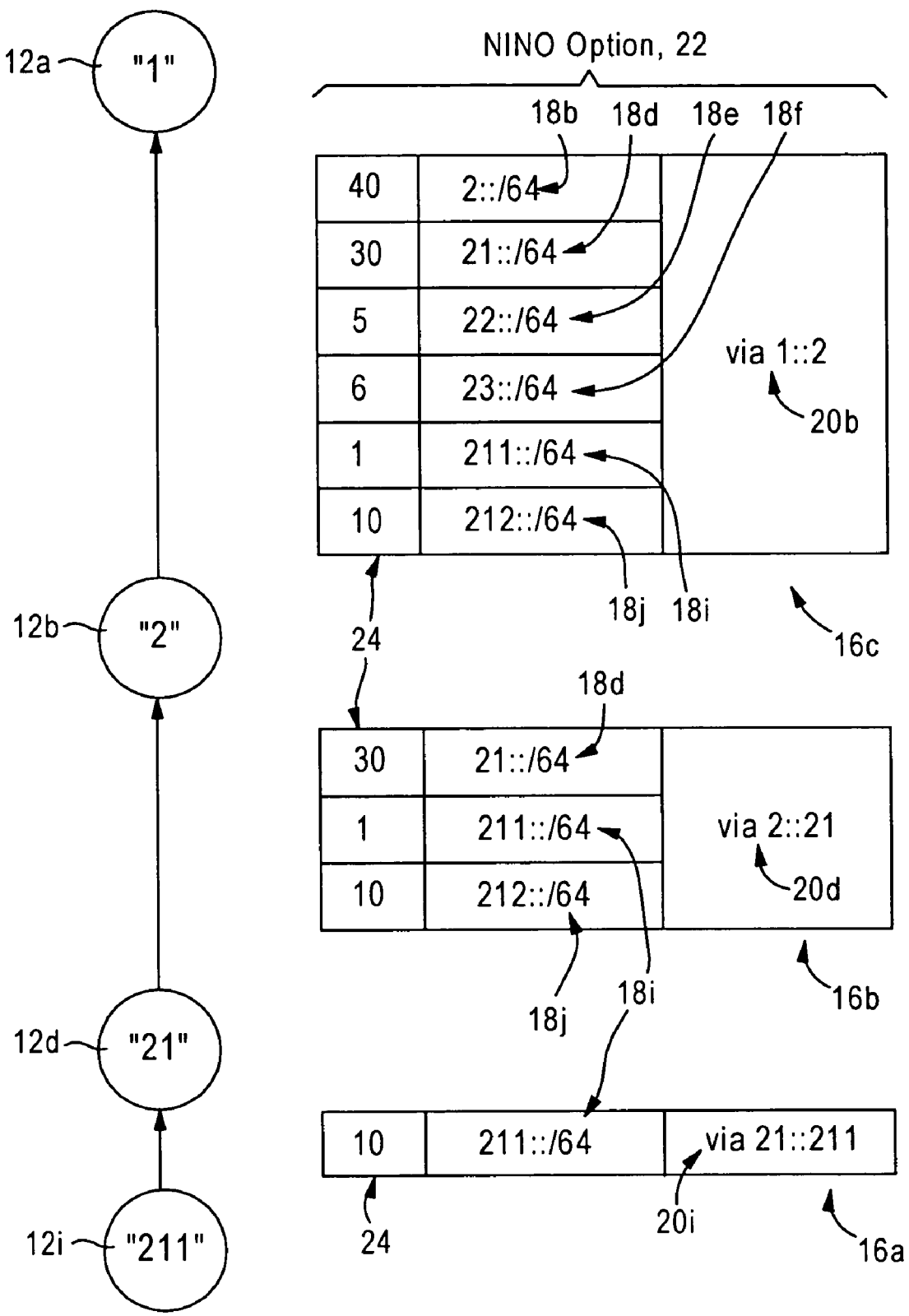
FIG. 2 is a diagram illustrating accumulation of network prefixes reachable by a single attachment address, based on mobile routers propagating respective neighbor advertisement messages toward the clusterhead, according to an embodiment of the present invention.

FIG. 2 is a diagram illustrating successive neighbor advertisement messages 16a, 16b, and 16c output by the respective mobile routers 12i, 12d, and 12b based on having attached to an attachment router according to the tree topology 10 of FIG. 1. As illustrated in FIG. 2, the mobile router 12i outputs the neighbor advertisement message 16a with a network-in-node option portion 22 specifying the address prefix ("211::/64") 18i used by the mobile router 12i, and the default attachment address 20i selected by the mobile router 12i. As described above, the default attachment address 20i is within the address space of the attachment prefix ("21::/64) 18d used by the mobile router 12d serving as an attachment router for the mobile router 12i.

The neighbor advertisement message 16a also includes a sequence identifier 24 for the corresponding address prefix 18i, described below.

The mobile router 12d, in response to receiving the neighbor advertisement message 16a, creates an entry in its internal ad hoc routing table that specifies that the address prefix ("211::/64") 18i is reachable via the attachment address ("21::211") 20i. As apparent from the foregoing, since the attachment address 20i is within the address space of the attachment prefix 18d used by the mobile router 12d, the mobile router 12d will know how to route any data packet to the attachment address 20i based on correlating the attachment address 20i to a prescribed ingress interface having a prescribed layer 2 (MAC) address. Although not shown, it is assumed the mobile router 12d also creates a routing table entry for the mobile router 12j in response to receiving a corresponding neighbor advertisement message 16 from the mobile router 12j specifying that its corresponding network prefix ("212::/64") 18j is reachable via its corresponding default attachment address ("21::212").

In response to creating the new entry in its internal ad hoc routing table, the mobile router 12d outputs the neighbor advertisement message 16b that specifies that the network address prefix 18d used by the mobile router 12d, as well as the network address prefixes 18i and 18j stored in its ad hoc routing table, are reachable via the default attachment address ("2::21") 20d of the mobile router 12d.

The mobile router 12b repeats the process of adding entries to its internal ad hoc routing table in response to receiving the neighbor advertisement message 16b, and the neighbor advertisement messages from the mobile router 12e and 12f specifying that the address prefixes "22::/64" 18*e* and "23::/64" 18*f* are reachable via the default attachment addresses "2::22" and "2::23", respectively. In response to adding the entries, the mobile router 12*b* outputs the neighbor advertisement message 16*c* specifying that its prescribed subnet prefix ("2::/64") 18*b*, plus the address prefixes 18*d*, 18*e*, 18*f*, 18*i*, and 18*j* stored in its internal ad hoc routing table are reachable via the default attachment address ("1::2") 20*b* of the mobile router 12*b*. Also note that each network prefix 18 specified in the neighbor advertisement message 16*a*, 16*b* has its corresponding sequence identifier 24 propagated up to the next neighbor advertisement message 16*c*.

Hence, in response to receiving the neighbor advertisement message 16*c* from the attached mobile router 12*b*, and a corresponding neighbor advertisement message 16 from the mobile router 12*c*, the mobile router 12*a* has sufficient address information to reach all of the subnet prefixes 18 in the network 10, and needs to choose simply whether to route a packet to the attachment address "1::2" or "1::3" within its prescribed subnet prefix "1::/64".

Figure 5:
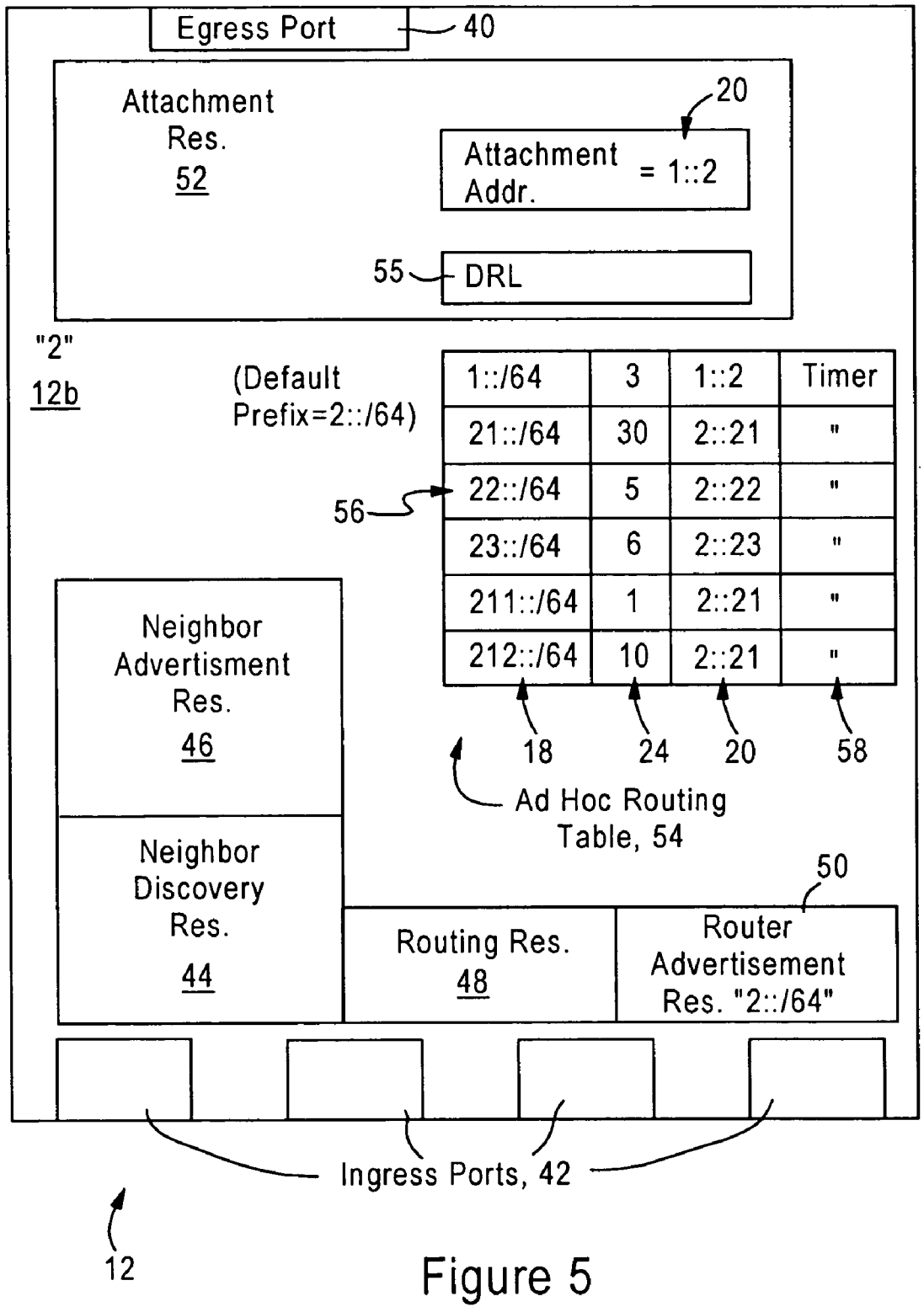
FIG. 5 is a diagram illustrating any one of the mobile routers of FIG. 1, according to an embodiment of the present invention.

FIG. 5 is a diagram illustrating one of the mobile routers 12, according to an embodiment of the present invention. For illustration sake, the mobile router 12*b* ("2") is illustrated in FIG. 5 to illustrate the values stored in the routing table 54. The mobile router 12 includes one or more egress port(s) 40 configured for establishing an attachment link with an attachment router (e.g., the clusterhead 12*a*), and multiple ingress ports 42 configured for outputting router advertisement messages and receiving neighbor discovery messages 16. Each of the ingress and egress ports may be implemented, for example, as interfaces such as wireless IEEE 802.11 links.

The mobile router 12 also includes a neighbor discovery resource 44, a neighbor advertisement resource 46, a routing resource 48, a router advertisement resource 50, an attachment resource 52, and an ad hoc routing table 54. The attachment resource 52 includes a default router list 55, illustrated in FIG. 4. As recognized in the art, each of these resources may be implemented as software based resources, such as executable code stored on a computer readable medium and which when executed by a microprocessor creates an application runtime environment in an assigned memory space; alternatively, these resources may be implemented as hardware-based state machines or by programming of field programmable gate arrays, or by mask programming of integrated circuits. The neighbor advertisement resource 46, the neighbor discovery resource 44, and the router advertisement resource 50 can be implemented for example in accordance with the Request for Comments (RFC) 2461, Neighbor Discovery for IP version 6 (IPv6), published by the IETF.

Figure 3:
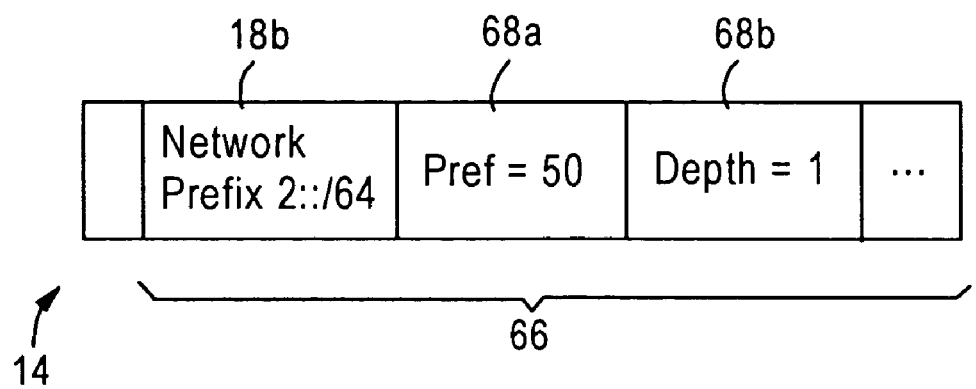
FIG. 3 is a diagram illustrating in detail a router advertisement message having tree information option fields.

The advertisement resource 46 is configured for outputting advertisement messages 14 including the tree information option field 66, illustrated in FIG. 3. In particular, the advertisement message 14 output by the mobile router 12*b* specifies within the tree information option field 66 the network prefix 18*b*, a preference value 68*a*, and/or a tree depth 68*b*. The preference field 68*a* is configured for storing a preference value for the mobile router 12 as stored in a corresponding preference register (not shown), enabling a mobile router receiving the RA message 14 to decide whether to associate with the source of the RA message 14. The tree depth field 68*b* is configured for storing the depth of the mobile router 12 within the tree (i.e., the number of hops to the clusterhead), enabling other routers receiving the RA message 34 to determine the relative position of the router advertisement originator within the tree 10.

The neighbor discovery resource 44 is configured for adding the respective entries 56 to the ad hoc routing table 54 based on receiving the respective neighbor advertisement messages 16. The neighbor discovery resource 44 also is configured for determining whether to overwrite an existing entry 56 based on receiving another neighbor advertisement message 16 that specifies a sequence number 24 for the corresponding address prefix 18 that is higher than the stored sequence number 24. The neighbor discovery resource 44 also is configured for selectively deleting the table entry 56, for example based on determining that an inactivity timer entry value 58 indicates, when compared with an internal system clock, that a prescribed inactivity interval has elapsed, requiring the inactive entry 56 be removed from the table 54.

The attachment resource 52 includes a default router list 55, enabling the attachment resource 52 to select an attachment router from the corresponding router advertisement message 14 according to selection criteria as specified by the corresponding preference value 68*a* and/or tree depth value 68*b*, to ensure that the attachment router is selected in a manner to ensure the tree topology is maintained in the ad hoc network. Hence, the attachment resource 52 is responsible for implementing the protocol requiring establishment of the tree topology in the ad hoc network. Additional details regarding selection of an attachment router to ensure a tree-based topology is described in the above-incorporated application Ser. No. 10/218,515, published Feb. 19, 2004.

Figure 4:
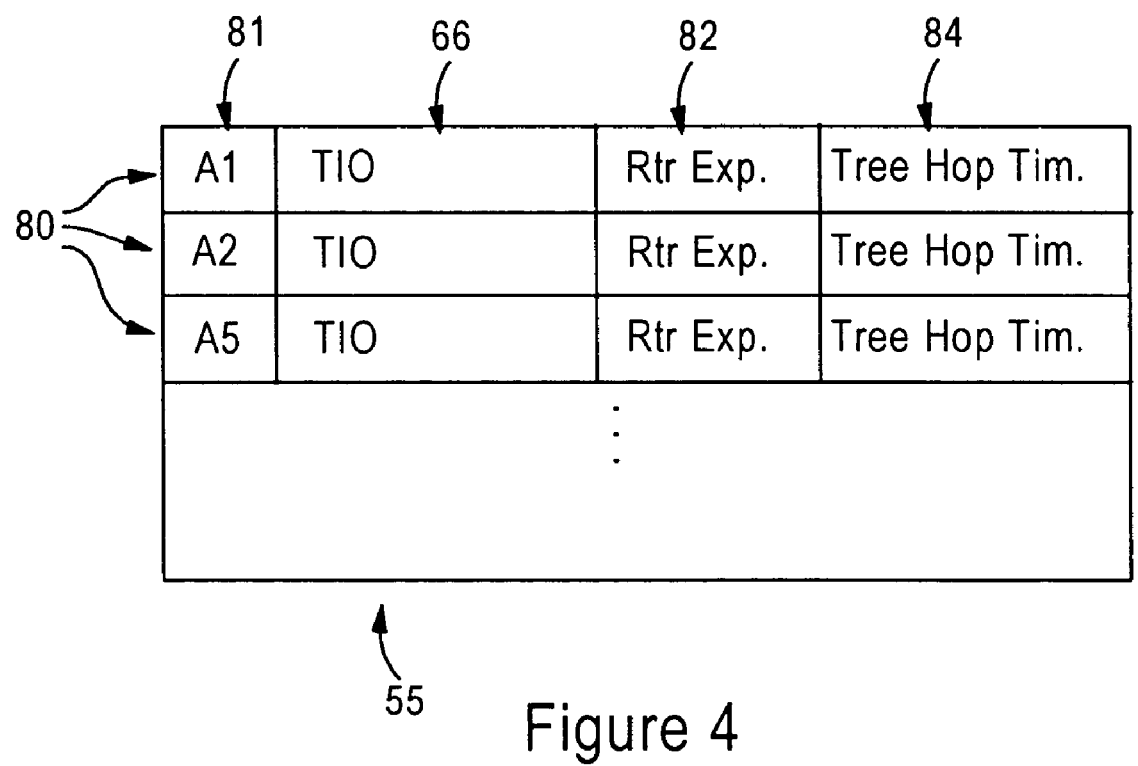
FIG. 4 is a diagram illustrating in detail a default router list configured for storing default router list entries including tree information option fields from received router advertisement messages.

In summary, the default router list 55, illustrated in FIG. 4, is configured for storing the known trees 38 in an ordered list, per order of preference, by extending IPv6 default router lists to include tree information. In particular, each entry 80 of the default router list 55 includes a router address field 81, the tree information option fields 66 as received from the router advertisement message 14, a router expiration timer field 82 that specifies information, including timer ID, to determine the expiration of the entry, and a tree hop timer field 84 that specifies information, including a corresponding timer ID, to delay any response to a received RA message in order to provide tree stability.

A timer resource in the attachment resource 52 is configured for calculating timer values from the timer information stored in the fields 82, 84, to determine if the corresponding timer has expired, requiring priority determination or selection operations.

Hence, the attachment resource 52 in each router 12 independently determines whether to associate with another router advertisement originator having output an RA message based on the tree information segment 66 within the RA message 14: the tree information segment 66 specifies attributes 68 about the tree to which the router advertisement originator is associated, including tree identifier (address prefix) tree depth, and tree preference. Once stored as entries in the default router list 55, the priority determination resource 42 can maintain the known trees in an ordered list, per order of preference: each entry 80 is maintained until the corresponding router expiration timer field 82 expires.

It should be noted that multiple trees typically should be present in the ad hoc network 10 only during initial formation of the tree-based topology: in other words, smaller trees will eventually converge into a single larger tree, resulting in more stability and connectivity throughout the entire ad hoc network. Nevertheless, the use of neighbor advertisement messages can still used in individual trees during network formation, since the relatively low overhead enables information to be quickly updated with rapid convergence.

The attachment resource 52 in the mobile router (e.g., 12*b*) identifies the selected attachment router (e.g., 12*a*) by choosing a default attachment address (e.g., "1::2") 20 within the address space of the advertised prefix (i.e., the attachment prefix) (e.g., "1::/64"), and adding a table entry 56 that specifies that the attachment prefix (e.g., "1::/64") is reachable via the default attachment address ("1::2") 20.

The mobile router 12 of FIG. 5 (e.g., 12*b*) also includes a neighbor advertisement resource 46. As described above with respect to FIG. 2, the neighbor advertisement resource 46 is configured for outputting the corresponding neighbor advertisement message 16 (e.g., 16*c*) specifying the corresponding address prefix (e.g., "2::/64" 18*b*) used by the mobile router, as well as the address prefixes (e.g., 18*d*, 18*e*, 18*f*, 18*i*, 18*j*) stored in the ad hoc routing table 54 by the neighbor discovery resource 44 in response to received neighbor advertisement messages 16 from attached mobile routers, are reachable via the default attachment address 20 (e.g. "1::2" 20*b*).

The routing resource 48 is configured for routing a received data packet having a specified destination address. If the specified destination address is within the address realms of one of the address prefixes stored in the ad hoc routing table 54, the routing resource 48 outputs the data packet to the specified attachment address 20. However, if the specified destination is unknown (i.e., no common prefix specified within the ad hoc routing table 56), the data packet is output using the default attachment address 20 to the attachment router via the egress port 40, based on the assumption that the attachment router will have more routing information. If the mobile router 12 does not have an attachment router and the specified destination is unknown, the packet is dropped.

Figure 6:
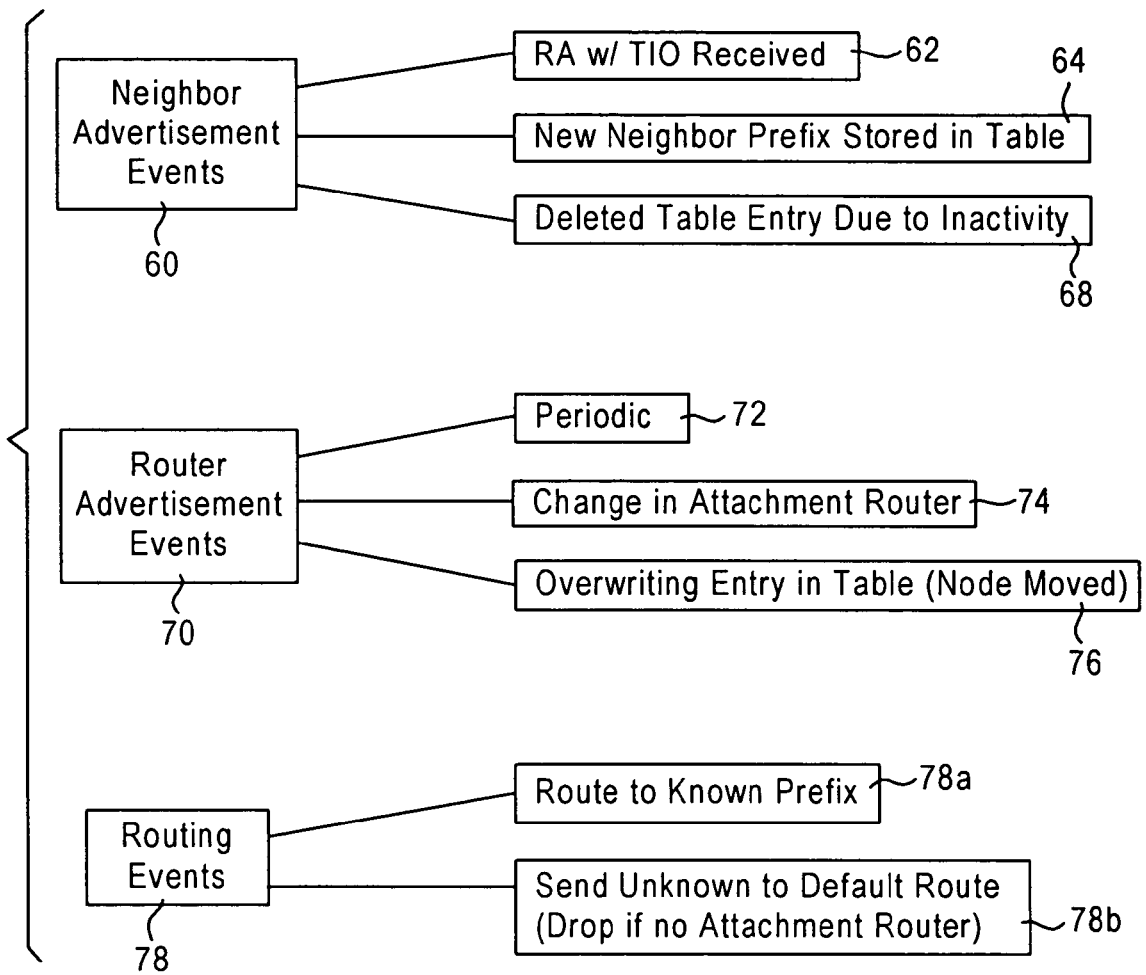
FIG. 6 is a diagram illustrating neighbor advertisement message output events, router advertisement message output events, and routing events.

FIG. 6 is a diagram summarizing different events that may cause different operations within the mobile router 12. For example, the neighbor advertisement resource 46 is configured for executing neighbor advertisement events 60 (i.e., outputting a neighbor advertisement message 16) in response to reception of a router advertisement message 14 specifying a tree information option 66 (event 62), in response to the neighbor discovery resource 44 storing a new address prefix entry 56 in the table 54 (event 64), or in response to deletion of an entry 56 by the neighbor discovery resource 44 due to inactivity, as measured by the corresponding timer entry 58 (event 68). The execution of the event 60 in response to the event 62 enables an attachment router to force attached mobile routers to resubmit their neighbor advertisement messages, for example if the attachment router detects a topology change, described below.

The router advertisement resource 50 is configured for outputting router advertisement messages (event 70) either at prescribed periodic intervals (event 72), in response to a change in the attachment router (event 74), or in response to overwriting an entry 56 in the table 54 due to a detected node movement (event 76). Note that event 76 in the attachment router causes the execution of event 60 in the attached router in response to event 62.

The routing resource 48 performs one of two routing events 78: routing a known destination address to a prescribed destination specified in the ad hoc routing table 54 (event 78*a*), or routing an unknown destination address to the default attachment address 20 for the mobile router (event 78*b*); if the mobile router is not attached to an attachment router (e.g., the mobile router is the clusterhead 12*a*), the packet is dropped.

Figure 7A:
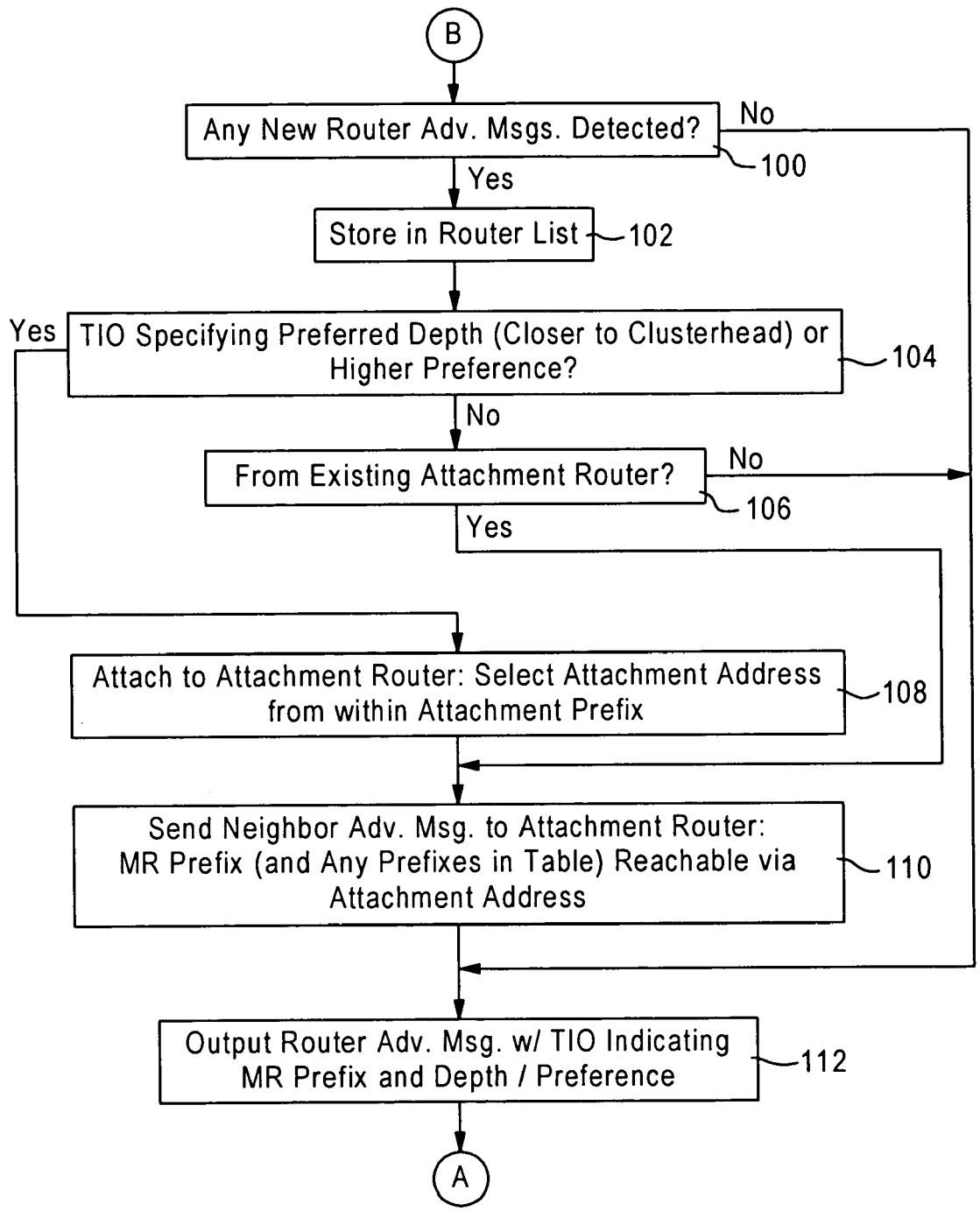
FIGS. 7A and 7B are diagrams summarizing the method the routers of FIG. 1 of establshing an ad hoc network, according to an embodiment of the present invention.
Figure 7B:
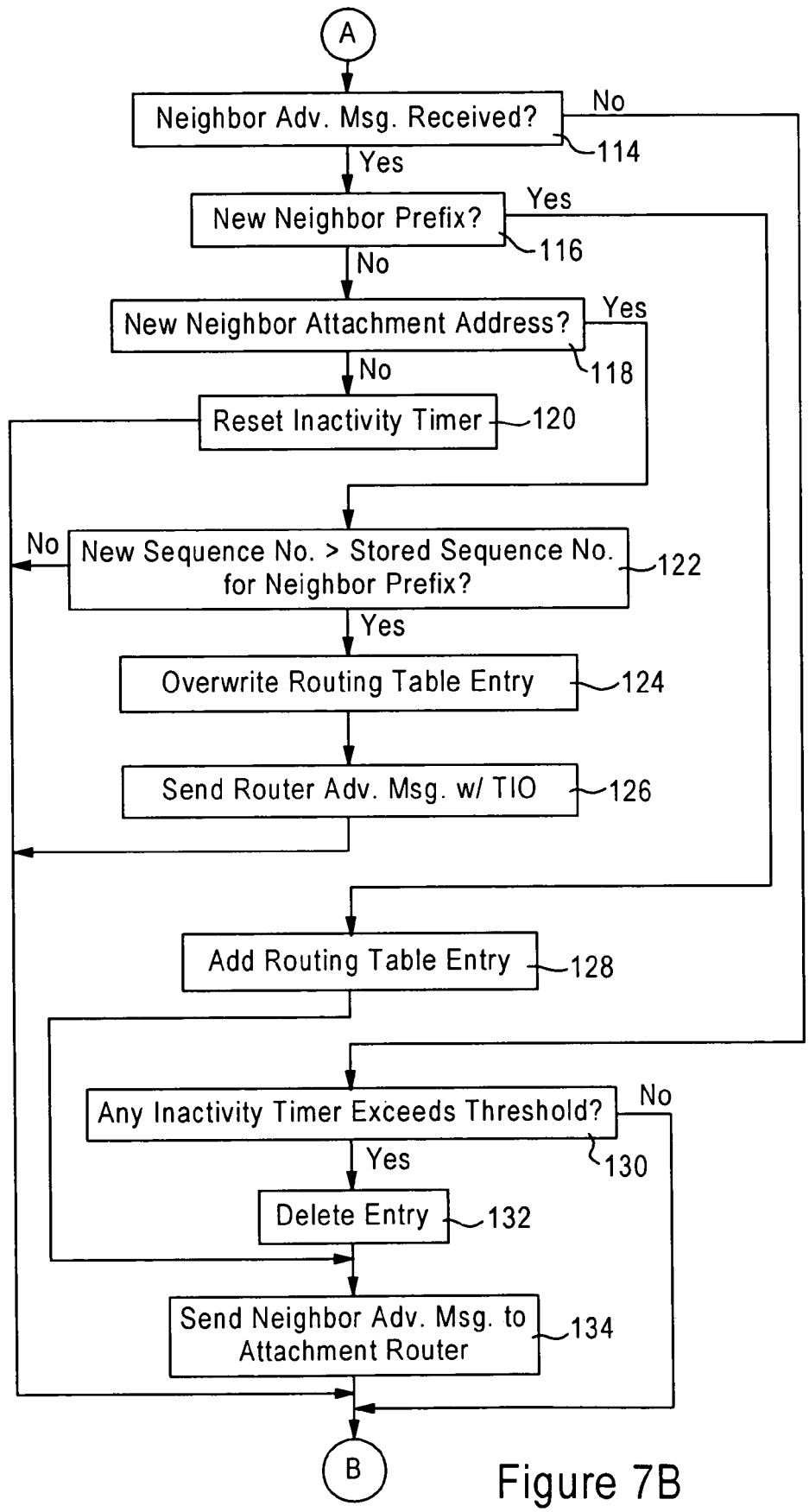

FIGS. 7A and 7B are diagrams illustrating the method of establishing an ad hoc network by the mobile router of FIG. 5, according to an embodiment of the present invention. The steps described in FIGS. 7A and 7B can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

It should be noted that the disclosed method is only by way of illustration, since FIG. 6 illustrates the events which would cause transmission of either a router advertisement message with a tree information option, or an updated neighbor advertisement message.

Referring to FIG. 7, the method begins in step 100, where the attachment resource 52 determines whether any new router advertisement messages 14 has been received. If a new router advertisement message 14 has been received, the attachment resource 52 stores in step 102 the router advertisement information in the default router list 55. The attachment resource 52 determines in step 104 whether the tree information option (TIO) for the received router advertisement message 14 indicates a preferred depth closer to the clusterhead 12*a*, or a higher preference. If a preferred depth or higher preference is detected, the attachment resource 52 attaches to the attachment router in step 108 by selecting a default attachment address 20 from within the attachment prefix advertised in the router advertisement message. The neighbor advertisement resource 46 in response sends in step 110 the neighbor advertisement message 16 to the attachment router in accordance with event 62 of FIG. 6, specifying that the default mobile router prefix used by the mobile router, and any prefixes specified in the table, are reachable via the selected attachment address.

If in step 104 the router advertisement message does not indicate a preferred attachment router, and if in step 106 the router advertisement message with the tree information option is from the existing attachment router, the neighbor advertisement resource 46 outputs in step 110 the neighbor advertisement message in accordance with the event 62 specified in FIG. 6.

Depending on the router state as described above with respect to event 70, the router advertisement resource 50 outputs in step 112 the corresponding router advertisement message 14, in accordance with event 72, 74, or 76.

Referring to FIG. 7B, if in step 114 the neighbor discovery resource 44 does not detect any neighbor advertisement messages 16, the neighbor discovery resource 44 checks in step 130 whether any of the inactivity timers 58 exceed the prescribed threshold. If in step 130 the neighbor discovery resource 44 detects that one of the timers has exceeded the prescribed threshold, the neighbor discovery resource 44 deletes in step 132 the corresponding entry 56, and sends in step 134 an updated neighbor advertisement message 16, in accordance with event 68 in FIG. 6.

If in step 114 a neighbor advertisement message 16 is received, the neighbor discovery resource 44 determines in step 116 whether the new message 16 specifies a new neighbor prefix 18 that is not present in the ad hoc routing table 54. If the new message 16 specifies a new neighbor prefix 18, the neighbor discovery resource 44 adds the new entry 56 to the ad hoc routing table 54 in step 128, and sends an updated neighbor advertisement message in step 134, in accordance with the event 64 specified in FIG. 6.

If in step 116 the neighbor advertisement message 16 is not a new neighbor prefix, and if in step 118 the neighbor advertisement message 16 does not specify a new neighbor attachment address, the router is a copy of a pre-existing message 16 to indicate continued activity of the mobile router having sent the neighbor advertisement message; hence, the neighbor discovery resource 44 resets in step 120 the corresponding inactivity timer 58 for the specified neighbor prefix, for example by storing in the field 58 for the corresponding entry 56 a clock value equal to the current clock time plus a prescribed time interval (hence, the neighbor discovery resource 44 can determine expiration of the timer by determining that the system clock value is greater than or equal to the value specified in the timer field 58).

Assume in step 118 that the neighbor discovery resource 44 determines that the neighbor advertisement message 16 specifies a new neighbor attachment address. For example, assume the mobile router ("212") 12j moves from the mobile router ("21") 12d and attaches to the mobile router ("23") 12f by discarding the old attachment address ("21::212") 20 and creating a new attachment address (e.g., "23::212") 20. In this case, the mobile router 12j would send the neighbor advertisement message 16 to its new attachment router 12f: the attachment router 12f would update its ad hoc routing table 54, and send an updated neighbor advertisement message 16 to its attachment router 12b, which in turn would send an updated neighbor advertisement message 16 to the clusterhead 12a. As apparent from the foregoing, however, the original attachment router 12d still is not aware that the mobile router 12j has moved, preventing the router 12d from transferring data packets from the mobile router 12i to the mobile router 12j.

Hence, two procedures can be used to ensure reachability. First, the neighbor discovery resource 44 determines in step 122 whether the new sequence number 24 for the specified neighbor prefix 20 is greater than the stored sequence number 24. If the new sequence number for the specified neighbor prefix 20 is greater than the stored sequence number, indicating a newer neighbor discovery message, the neighbor discovery resource 44 overwrites in step 124 the existing entry 56 with the new sequence number 24 and the new attachment address 20 specified in the new neighbor advertisement message. The router advertisement resource 50 in response sends in step 126 the router advertisement message 14 with the tree information option, in accordance with the event 76 in FIG. 6.

According to the disclosed embodiment, mobile routers can be configured to automatically select which router to attach to within a mobile network, in a manner that enables selection according to prescribed network and topology based preferences, to establish a tree based topology. Use of the tree based topology enables the routers to share prefix information, in the form of network-in-node-option based neighbor advertisement messages, eliminating the necessity for implementing complex routing protocol. Hence, the disclosed embodiment provides a proactive routing protocol with minimal overhead.

In addition, topology changes in leaf nodes (e.g., node 12j moving from 12d to 12f) are transparent to the clusterhead, since routability remains the same, namely via the same intermediate router (e.g., 12b). Hence, the necessity for numerous update messages to the clusterhead are minimized, enabling the resulting savings in bandwidth to utilized for data transport.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile router configured for establishing communications within an ad hoc network, the method comprising:

attaching to an attachment router based on an advertisement message from the attachment router that specifies an attachment prefix, and according to a protocol requiring establishment in the ad hoc network of a tree topology having a single clusterhead, and based on selecting a default attachment address within an address space of the attachment prefix; and outputting to the attachment router a neighbor advertisement message specifying that a prescribed address prefix used by the mobile router is reachable via the default attachment address, based on the mobile router having attached to the attachment router, the prescribed address prefix distinct from the attachment prefix.

2. The method of claim 1, further comprising:

outputting a second advertisement message specifying the prescribed address prefix and a tree information option field specifying attributes of the mobile router relative to the tree topology;

receiving via an ingress interface a second neighbor advertisement message that specifies a second address prefix is reachable via a second attachment address within the address space of the prescribed address prefix; and adding an entry to an ad hoc routing table, the entry specifying that the second address prefix is reachable using the second attachment address via the ingress interface.

3. The method of claim 2, further comprising outputting to the attachment router a third neighbor advertisement message, specifying that the prescribed address prefix and the second address prefix are reachable via the default attachment address, in response to reception of the second neighbor advertisement message, the second address prefix distinct from the prescribed address prefix and the attachment prefix.

4. The method of claim 3, further comprising deleting the entry from the ad hoc routing table based on determined absence of activity from the second attachment address via the ingress interface for at least a prescribed time interval.

5. The method of claim 3, further comprising:

receiving via a second ingress interface a fourth neighbor advertisement message that specifies the second address prefix is reachable via a third attachment address within the address space of the prescribed address prefix; and overwriting the entry in the ad hoc routing table to specify that the second address prefix is reachable using the third attachment address via the second ingress interface, based on receiving the fourth neighbor advertisement message following reception of the second neighbor advertisement message.

6. The method of claim 5, further comprising outputting on the first and second ingress interfaces a third advertisement message, specifying the prescribed address prefix and the tree information option field, in response to the overwriting of the entry.

7. The method of claim 3, further comprising outputting to the attachment router, in response to a new advertisement message from the attachment router specifying the attachment prefix, a new advertisement message specifying that the prescribed address prefix, and any address prefixes stored in the ad hoc routing table based on respective received neighbor advertisement messages, including the second address prefix, are reachable via the default attachment address.

8. The method of claim 3, further comprising:

receiving via the ingress interface a data packet having a specified destination address;

determining whether the ad hoc routing table includes any one of the specified destination address or an address table entry having a specified address prefix encompassing the specified destination address; and outputting the data packet to the attachment router based on a determined absence of any one of the specified destination address or the address table entry in the ad hoc routing table.

9. The method of claim 3, wherein:
the outputting of the neighbor advertisement message includes specifying a first unique sequence number for the prescribed address prefix;
the receiving including detecting within the second neighbor advertisement message a second sequence number associated with the second address prefix; and
the outputting of the third neighbor advertisement message includes specifying a third unique sequence number, greater than the first unique sequence number, for the prescribed address prefix.

10. The method of claim 9, further comprising:
receiving via a second ingress interface a fourth neighbor advertisement message that specifies the second address prefix is reachable via a third attachment address within the address space of the prescribed address prefix, and a fourth sequence number associated with the second address prefix; and
selectively overwriting the entry in the ad hoc routing table to specify that the second address prefix is reachable using the third attachment address via the second ingress interface, based on the fourth sequence number for the second address prefix being greater than the second sequence number.

11. The method of claim 2, further comprising outputting to the attachment router a third neighbor advertisement message, specifying that the prescribed address prefix and the second address prefix are reachable via the default attachment address, in response to reception of the second neighbor advertisement message.

12. The method of claim 1, wherein the attaching includes:
detecting within the advertisement message a tree information option field specifying a tree identifier and attributes of the attachment router relative to the tree topology, the attributes including one of a tree depth or a tree preference; and
selecting the attachment router, from a plurality of attachment routers having advertised respective tree identifiers and respective attributes, based on the attributes specified in the tree information option field.

13. The method of claim 1, wherein the neighbor advertisement message is a network node-based advertisement message, the outputting including inserting into the neighbor advertisement message a network-in-node option field that specifies the prescribed address prefix is reachable via the default attachment address.

14. A method in a mobile router configured for establishing communications within an ad hoc network, the method comprising:
outputting an advertisement message including a tree information option field that specifies a prescribed address prefix used by the mobile router, and a tree attribute field advertising one of a relative position or a relative preference of the mobile router within a tree topology of the ad hoc network;
receiving a first neighbor advertisement message specifying that at least a second address prefix is reachable via a first attachment address within an address space of the prescribed address prefix, the second address prefix distinct from the prescribed address prefix;
adding a first entry to an ad hoc routing table, the first entry specifying that the second address prefix is reachable via the first attachment address;
receiving a second neighbor advertisement message specifying that at least a third address prefix is reachable via a second attachment address within the address space of the prescribed address prefix, the third address prefix distinct from second address prefix and the prescribed address prefix;
adding a second entry to the ad hoc routing table, the second entry specifying that the third address prefix is reachable via the second attachment address;
receiving a data packet having a specified destination address; and
selectively routing the data packet to one of the first attachment address or the second attachment address based on determining the specified destination address is within the address space of a corresponding one of the second or third address prefixes.

15. The method of claim 14, wherein:
the receiving of the first neighbor advertisement message includes detecting that the first neighbor advertisement message specifies that the second address prefix, and a fourth address prefix are reachable via the first attachment address, the fourth address prefix distinct from the second and third address prefixes and the prescribed address prefix;
the method further comprising adding including adding a third entry to the ad hoc routing table that specifies that the fourth address prefix is reachable via the first attachment address.

16. The method of claim 15, further comprising
receiving a third neighbor advertisement message specifying that the third address prefix and the fourth address prefix are reachable via the second attachment address;
the method further comprising selectively overwriting the third entry to specify that the fourth address prefix is reachable via the second attachment address.

17. The method of claim 16, wherein the selectively overwriting includes overwriting the third entry to specify that the fourth address is reachable via the second attachment address based on receiving the third neighbor advertisement message following reception of the first neighbor advertisement message.

18. The method of claim 16, wherein:
the first neighbor advertisement message specifies first and second unique sequence numbers for the second and fourth address prefixes, respectively;
the third neighbor advertisement specifies a third sequence number for the fourth address prefix;
the selectively overwriting includes overwriting the third entry to specify that the fourth address is reachable via the second attachment address based on the third sequence number being greater than the second sequence number.

19. The method of claim 16, further comprising outputting another advertisement message including the tree information option field in response to overwriting the third entry.

20. The method of claim 14, further comprising deleting one of the first or second entries based on a detecting a corresponding prescribed interval of inactivity from the corresponding attachment address.

21. The method of claim 14, further comprising:
attaching to an attachment router based on a second advertisement message from the attachment router that specifies an attachment prefix, and according to a protocol requiring establishment in the ad hoc network of a tree topology having a single clusterhead, and based on selecting a default attachment address within an address space of the attachment prefix; and outputting to the attachment router a third neighbor advertisement message specifying that the prescribed address prefix, the second address prefix, and the third attachment prefix are reachable via the default attachment address, based on the mobile router having attached to the attachment router, each of the prescribed address prefix and the second and third address prefixes being distinct from the attachment prefix.

22. An ad hoc network comprising:
a first router having:
(1) an advertisement resource configured for outputting a first advertisement message including a tree information option field that specifies a prescribed address prefix used by the first router, and a tree attribute field that advertises the first router as a clusterhead of a tree topology in the ad hoc network,
(2) an ad hoc routing table configured for storing respective entries specifying that respective address prefixes are reachable via respective attachment addresses, and
(3) a neighbor discovery resource configured for adding the respective entries based on receiving respective neighbor advertisement message specifying that the respective address prefixes are reachable via the respective attachment addresses, each of the attachment addresses within an address space of the prescribed address prefix, each of the address prefixes distinct from each other and the prescribed address prefix; and
second and third mobile routers, each comprising:
(1) an attachment resource configured for attaching to the first router based on the first advertisement message and according to a protocol requiring establishment of a tree topology in the ad hoc network, and based on selecting the corresponding attachment address within the address space, and
(2) a neighbor advertisement resource configured for outputting the corresponding neighbor advertisement message specifying the corresponding address prefix used by the mobile router is reachable via the corresponding attachment address, based on the mobile router having attached to the first router.

23. The network of claim 22 wherein the first router further includes a routing resource configured for selectively routing a received data packet, having a specified destination address, to an identified one of the attachment addresses based on the destination address being determined to be within the address space of the corresponding address prefix specified in the corresponding entry of the ad hoc routing table.

24. The network of claim 22, further comprising a fourth mobile router having the attachment resource and the neighbor advertisement resource, wherein:
each of the second, third, and fourth mobile routers further includes:
(1) a corresponding advertisement resource for outputting a corresponding second advertisement message having a tree information option field that specifies the corresponding address prefix used by the corresponding mobile router;
(2) an ad hoc routing table; and
(3) the neighbor discovery resource;
the second mobile router, in response to detecting a neighbor advertisement message specifying an address prefix corresponding to the fourth mobile router is reachable via a first attachment address within the address space of the corresponding address prefix of the second mobile router:

(1) adds an entry to its routing table specifying that the address prefix corresponding to the fourth mobile router is reachable via the first attachment address, and
(2) outputs an updated neighbor advertisement message specifying the address prefix of the second mobile router and the address prefix of the fourth mobile router are reachable via the corresponding attachment address of the second mobile router.

25. The network of claim 24, wherein the advertisement resource of the first router, in response to its corresponding neighbor discovery resource detecting the updated neighbor advertisement message and updating the ad hoc routing table to specify that the address prefix of the second mobile router and the address prefix of the fourth mobile router are reachable via the corresponding attachment address of the second mobile router, outputs another first advertisement message.

26. A mobile router configured for establishing communications within an ad hoc network, the mobile router comprising:
means for attaching to an attachment router based on an advertisement message from the attachment router that specifies an attachment prefix, and according to a protocol requiring establishment in the ad hoc network of a tree topology having a single clusterhead, and based on selecting a default attachment address within an address space of the attachment prefix; and
first outputting means for outputting to the attachment router a neighbor advertisement message specifying that a prescribed address prefix used by the mobile router is reachable via the default attachment address, based on the mobile router having attached to the attachment router, the prescribed address prefix distinct from the attachment prefix.

27. The mobile router of claim 26, further comprising:
second outputting means for outputting a second advertisement message specifying the prescribed address prefix and a tree information option field specifying attributes of the mobile router relative to the tree topology;
an ad hoc routing table; and
means for receiving via an ingress interface a second neighbor advertisement message that specifies a second address prefix is reachable via a second attachment address within the address space of the prescribed address prefix, the means for receiving configured for adding an entry to the ad hoc routing table specifying that the second address prefix is reachable using the second attachment address via the ingress interface.

28. The mobile router of claim 27, wherein the first outputting means is configured for outputting to the attachment router a third neighbor advertisement message, specifying that the prescribed address prefix and the second address prefix are reachable via the default attachment address, in response to reception of the second neighbor advertisement message, the second address prefix distinct from the prescribed address prefix and the attachment prefix.

29. The mobile router of claim 28, wherein the means for receiving is configured for deleting the entry from the ad hoc routing table based on determined absence of activity from the second attachment address via the ingress interface for at least a prescribed time interval.

30. The mobile router of claim 29, wherein the means for receiving is configured for:
receiving via a second ingress interface a fourth neighbor advertisement message that specifies the second address prefix is reachable via a third attachment address within the address space of the prescribed address prefix; and overwriting the entry in the ad hoc routing table to specify that the second address prefix is reachable using the third attachment address via the second ingress interface, based on receiving the fourth neighbor advertisement message following reception of the second neighbor advertisement message.

31. The mobile router of claim 30, wherein the second outputting means is configured for outputting on the first and second ingress interfaces a third advertisement message, specifying the prescribed address prefix and the tree information option field, in response to the overwriting of the entry.

32. The mobile router of claim 28, wherein the first outputting means is configured for outputting to the attachment router, in response to a new advertisement message from the attachment router specifying the attachment prefix, a new advertisement message specifying that the prescribed address prefix, and any address prefixes stored in the ad hoc routing table based on respective received neighbor advertisement messages, including the second address prefix, are reachable via the default attachment address.

33. The mobile router of claim 28, further comprising routing means for determining whether the ad hoc routing table includes any one of a specified destination address, having been specified in data packet having been received via the ingress interface, or an address table entry having a specified address prefix encompassing the specified destination address, the routing means configured for outputting the data packet to the attachment router based on a determined absence of any one of the specified destination address or the address table entry in the ad hoc routing table.

34. The mobile router of claim 28, wherein:
the first outputting means is configured for specifying in the neighbor advertisement message a first unique sequence number for the prescribed address prefix;
the receiving means configured for detecting within the second neighbor advertisement message a second sequence number associated with the second address prefix; and
the first outputting means is configured for specifying in the third neighbor advertisement message a third unique sequence number, greater than the first unique sequence number, for the prescribed address prefix.

35. The mobile router of claim 34, wherein the receiving means is configured for:
receiving via a second ingress interface a fourth neighbor advertisement message that specifies the second address prefix is reachable via a third attachment address within the address space of the prescribed address prefix, and a fourth sequence number associated with the second address prefix; and
selectively overwriting the entry in the ad hoc routing table to specify that the second address prefix is reachable using the third attachment address via the second ingress interface, based on the fourth sequence number for the second address prefix being greater than the second sequence number.

36. The mobile router of claim 27, wherein the first outputting means is configured for outputting to the attachment router a third neighbor advertisement message, specifying that the prescribed address prefix and the second address prefix are reachable via the default attachment address, in response to reception of the second neighbor advertisement message.

37. The mobile router of claim 26, wherein the means for attaching is configured for:
detecting within the advertisement message a tree information option field specifying a tree identifier and attributes of the attachment router relative to the tree topology, the attributes including one of a tree depth or a tree preference; and
selecting the attachment router, from a plurality of attachment routers having advertised respective tree identifiers and respective attributes, based on the attributes specified in the tree information option field.

38. The mobile router of claim 26, wherein the neighbor advertisement message is a network node-based advertisement message, the first outputting means configured for inserting into the neighbor advertisement message a network-in-node option field that specifies the prescribed address prefix is reachable via the default attachment address.

39. A mobile router configured for establishing communications within an ad hoc network, the mobile router comprising:
means for outputting an advertisement message including a tree information option field that specifies a prescribed address prefix used by the mobile router, and a tree attribute field advertising one of a relative position or a relative preference of the mobile router within a tree topology of the ad hoc network;
an ad hoc routing table;
means for receiving a first neighbor advertisement message specifying that at least a second address prefix is reachable via a first attachment address within an address space of the prescribed address prefix, the second address prefix distinct from the prescribed address prefix, the receiving means further configured for:
(1) adding a first entry to the ad hoc routing table, the first entry specifying that the second address prefix is reachable via the second attachment address,
(2) receiving a second neighbor advertisement message specifying that at least a third address prefix is reachable via a second attachment address within the address space of the prescribed address prefix, the third address prefix distinct from second address prefix and the prescribed address prefix, and
(3) adding a second entry to the ad hoc routing table, the second entry specifying that the third address prefix is reachable via the second attachment address; and
means for selectively routing a data packet having a specified destination address, by selectively routing the data packet to one of the first attachment address or the second attachment address based on determining the specified destination address is within the address space of a corresponding one of the second or third address prefixes.

40. The mobile router of claim 39, wherein:
the receiving means is configured for detecting that the first neighbor advertisement message specifies that the second address prefix, and a fourth address prefix are reachable via the first attachment address, the fourth address prefix distinct from the second and third address prefixes and the prescribed address prefix;
the receiving means is configured for adding a third entry to the ad hoc routing table that specifies that the fourth address prefix is reachable via the first attachment address.

41. The mobile router of claim 40, wherein:
the receiving means is configured for receiving a third neighbor advertisement message specifying that the third address prefix and the fourth address prefix are reachable via the second attachment address;
the receiving means is configured for selectively overwriting the third entry to specify that the fourth address prefix is reachable via the second attachment address.

42. The mobile router of claim 41, wherein the receiving means is configured for overwriting the third entry to specify that the fourth address is reachable via the second attachment address based on receiving the third neighbor advertisement message following reception of the first neighbor advertisement message.

43. The mobile router of claim 41, wherein:
the first neighbor advertisement message specifies first and second unique sequence numbers for the second and fourth address prefixes, respectively;
the third neighbor advertisement specifies a third sequence number for the fourth address prefix;
the receiving means is configured for overwriting the third entry to specify that the fourth address is reachable via the second attachment address based on the third sequence number being greater than the second sequence number.

44. The mobile router of claim 41, wherein the means for outputting is configured for outputting another advertisement message including the tree information option field in response to the receiving means overwriting the third entry.

45. The mobile router of claim 39, wherein the receiving means is configured for deleting one of the first or second entries based on a detecting a corresponding prescribed interval of inactivity from the corresponding attachment address.

46. The mobile router of claim 39, further comprising:
means for attaching to an attachment router based on a second advertisement message from the attachment router that specifies an attachment prefix, and according to a protocol requiring establishment in the ad hoc network of a tree topology having a single clusterhead, and based on selecting a default attachment address within an address space of the attachment prefix; and
means for outputting to the attachment router a third neighbor advertisement message specifying that the prescribed address prefix, the second address prefix, and the third attachment prefix are reachable via the default attachment address, based on the mobile router having attached to the attachment router, each of the prescribed address prefix and the second and third address prefixes being distinct from the attachment prefix.

47. A mobile router configured for establishing communications within an ad hoc network, the mobile router comprising:
an attachment circuit configured for attaching to an attachment router based on an advertisement message from the attachment router that specifies an attachment prefix, and according to a protocol requiring establishment in the ad hoc network of a tree topology having a single clusterhead, and based on selecting a default attachment address within an address space of the attachment prefix; and
a neighbor advertisement circuit configured for outputting to the attachment router a neighbor advertisement message specifying that a prescribed address prefix used by the mobile router is reachable via the default attachment address, based on the mobile router having attached to the attachment router, the prescribed address prefix distinct from the attachment prefix.

48. The mobile router of claim 47, further comprising:
a router advertisement circuit configured for outputting a second advertisement message specifying the prescribed address prefix and a tree information option field specifying attributes of the mobile router relative to the tree topology;
an ad hoc routing table; and
a neighbor discovery circuit configured for receiving via an ingress interface a second neighbor advertisement message that specifies a second address prefix is reachable via a second attachment address within the address space of the prescribed address prefix, the neighbor discovery circuit configured for adding an entry to the ad hoc routing table specifying that the second address prefix is reachable using the second attachment address via the ingress interface.

49. The mobile router of claim 48, wherein the neighbor advertisement circuit is configured for outputting to the attachment router a third neighbor advertisement message, specifying that the prescribed address prefix and the second address prefix are reachable via the default attachment address, in response to reception of the second neighbor advertisement message, the second address prefix distinct from the prescribed address prefix and the attachment prefix.

50. The mobile router of claim 49, wherein the neighbor discovery circuit is configured for deleting the entry from the ad hoc routing table based on determined absence of activity from the second attachment address via the ingress interface for at least a prescribed time interval.

51. The mobile router of claim 49, wherein the neighbor discovery circuit is configured for:
receiving via a second ingress interface a fourth neighbor advertisement message that specifies the second address prefix is reachable via a third attachment address within the address space of the prescribed address prefix; and
overwriting the entry in the ad hoc routing table to specify that the second address prefix is reachable using the third attachment address via the second ingress interface, based on receiving the fourth neighbor advertisement message following reception of the second neighbor advertisement message.

52. The mobile router of claim 51, wherein the router advertisement circuit is configured for outputting on the first and second ingress interfaces a third advertisement message, specifying the prescribed address prefix and the tree information option field, in response to the overwriting of the entry.

53. The mobile router of claim 49, wherein the neighbor advertisement circuit is configured for outputting to the attachment router, in response to a new advertisement message from the attachment router specifying the attachment prefix, a new advertisement message specifying that the prescribed address prefix, and any address prefixes stored in the ad hoc routing table based on respective received neighbor advertisement messages, including the second address prefix, are reachable via the default attachment address.

54. The mobile router of claim 49, further comprising a routing circuit configured for determining whether the ad hoc routing table includes any one of a specified destination address, having been specified in data packet having been received via the ingress interface, or an address table entry having a specified address prefix encompassing the specified destination address, the routing circuit configured for outputting the data packet to the attachment router based on a determined absence of any one of the specified destination address or the address table entry in the ad hoc routing table.

55. The mobile router of claim 49, wherein:
the neighbor advertisement circuit is configured for specifying in the neighbor advertisement message a first unique sequence number for the prescribed address prefix;
the neighbor discovery circuit configured for detecting within the second neighbor advertisement message a second sequence number associated with the second address prefix; and the neighbor advertisement circuit is configured for specifying in the third neighbor advertisement message a third unique sequence number, greater than the first unique sequence number, for the prescribed address prefix.

56. The mobile router of claim 55, wherein the neighbor discovery circuit is configured for:
receiving via a second ingress interface a fourth neighbor advertisement message that specifies the second address prefix is reachable via a third attachment address within the address space of the prescribed address prefix, and a fourth sequence number associated with the second address prefix; and
selectively overwriting the entry in the ad hoc routing table to specify that the second address prefix is reachable using the third attachment address via the second ingress interface, based on the fourth sequence number for the second address prefix being greater than the second sequence number.

57. The mobile router of claim 48, wherein the neighbor advertisement circuit is configured for outputting to the attachment router a third neighbor advertisement message, specifying that the prescribed address prefix and the second address prefix are reachable via the default attachment address, in response to reception of the second neighbor advertisement message.

58. The mobile router of claim 47, wherein the attachment circuit is configured for:
detecting within the advertisement router message a tree information option field specifying a tree identifier and attributes of the attachment router relative to the tree topology, the attributes including one of a tree depth or a tree preference; and
selecting the attachment router, from a plurality of attachment routers having advertised respective tree identifiers and respective attributes, based on the attributes specified in the tree information option field.

59. The mobile router of claim 47, wherein the neighbor advertisement message is a network node-based advertisement message, the neighbor advertisement circuit configured for inserting into the neighbor advertisement message a network-in-node option field that specifies the prescribed address prefix is reachable via the default attachment address.

60. A mobile router configured for establishing communications within an ad hoc network, the mobile router comprising:
a router advertisement circuit configured for outputting an advertisement message including a tree information option field that specifies a prescribed address prefix used by the mobile router, and a tree attribute field advertising one of a relative position or a relative preference of the mobile router within a tree topology of the ad hoc network;
an ad hoc routing table;
a neighbor discovery circuit configured for receiving a first neighbor advertisement message specifying that at least a second address prefix is reachable via a first attachment address within an address space of the prescribed address prefix, the second address prefix distinct from the prescribed address prefix, the neighbor discovery circuit further configured for:
(1) adding a first entry to the ad hoc routing table, the first entry specifying that the second address prefix is reachable via the second attachment address,
(2) receiving a second neighbor advertisement message specifying that at least a third address prefix is reachable via a second attachment address within the address space of the prescribed address prefix, the third address prefix distinct from second address prefix and the prescribed address prefix, and
(3) adding a second entry to the ad hoc routing table, the second entry specifying that the third address prefix is reachable via the second attachment address; and
a routing circuit configured for selectively routing a data packet having a specified destination address, by selectively routing the data packet to one of the first attachment address or the second attachment address based on determining the specified destination address is within the address space of a corresponding one of the second or third address prefixes.

61. The mobile router of claim 60, wherein:
the neighbor discovery circuit is configured for detecting that the first neighbor advertisement message specifies that the second address prefix, and a fourth address prefix are reachable via the first attachment address, the fourth address prefix distinct from the second and third address prefixes and the prescribed address prefix;
the neighbor discovery circuit is configured for adding a third entry to the ad hoc routing table that specifies that the fourth address prefix is reachable via the first attachment address.

62. The mobile router of claim 61, wherein:
the neighbor discovery circuit is configured for receiving a third neighbor advertisement message specifying that the third address prefix and the fourth address prefix are reachable via the second attachment address;
the neighbor discovery circuit is configured for selectively overwriting the third entry to specify that the fourth address prefix is reachable via the second attachment address.

63. The mobile router of claim 62, wherein the neighbor discovery circuit is configured for overwriting the third entry to specify that the fourth address is reachable via the second attachment address based on receiving the third neighbor advertisement message following reception of the first neighbor advertisement message.

64. The mobile router of claim 62, wherein:
the first neighbor advertisement message specifies first and second unique sequence numbers for the second and fourth address prefixes, respectively;
the third neighbor advertisement specifies a third sequence number for the fourth address prefix;
the neighbor discovery circuit is configured for overwriting the third entry to specify that the fourth address is reachable via the second attachment address based on the third sequence number being greater than the second sequence number.

65. The mobile router of claim 62, wherein the router advertisement circuit is configured for outputting another advertisement message including the tree information option field in response to the neighbor discovery circuit overwriting the third entry.

66. The mobile router of claim 60, wherein the neighbor discovery circuit is configured for deleting one of the first or second entries based on a detecting a corresponding prescribed interval of inactivity from the corresponding attachment address.

67. The mobile router of claim 60, further comprising:
an attachment circuit configured for attaching to an attachment router based on a second advertisement message from the attachment router that specifies an attachment prefix, and according to a protocol requiring establishment in the ad hoc network of a tree topology having a single clusterhead, and based on selecting a default attachment address within an address space of the attachment prefix;

the neighbor advertisement circuit configured for outputting to the attachment router a third neighbor advertisement message specifying that the prescribed address prefix, the second address prefix, and the third attachment prefix are reachable via the default attachment address, based on the mobile router having attached to the attachment router, each of the prescribed address prefix and the second and third address prefixes being distinct from the attachment prefix.

* * * * *